(12) United States Patent
Finkelstein (10) Patent No.: US 9,355,760 B2
(45) Date of Patent: May 31, 2016

(54) INTEGRATING OPTICAL FIBER WITH COAXIAL CABLE

(71) Applicant: COX COMMUNICATIONS, INC., Atlanta, GA (US)

(72) Inventor: Jeff Finkelstein, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 155 days.

(21) Appl. No.: 13/748,084

(22) Filed: Jan. 23, 2013

(65) Prior Publication Data

US 2014/0205294 A1  Jul. 24, 2014

(51) Int. Cl.
*G02B 6/44* (2006.01)
*H01B 11/22* (2006.01)
*G02B 6/50* (2006.01)

(52) U.S. Cl.
CPC .............. *H01B 11/22* (2013.01); *G02B 6/4415* (2013.01); *G02B 6/4416* (2013.01); *G02B 6/4479* (2013.01); *G02B 6/504* (2013.01); *Y10T 29/49117* (2015.01); *Y10T 29/49174* (2015.01)

(58) Field of Classification Search
None
See application file for complete search history.

(56) References Cited

U.S. PATENT DOCUMENTS

| | | | | |
|---|---|---|---|---|
| 3,973,227 A | * | 8/1976 | Erculiani | H01P 3/02 174/28 |
| 4,158,478 A | * | 6/1979 | D'Auria et al. | 385/101 |
| 4,484,963 A | * | 11/1984 | Anctil et al. | 156/56 |
| 4,600,268 A | * | 7/1986 | Spicer | 385/103 |
| 5,467,420 A | * | 11/1995 | Rohrmann et al. | 385/101 |
| 5,469,523 A | * | 11/1995 | Blew et al. | 385/101 |
| 5,481,635 A | * | 1/1996 | Arroyo et al. | 385/103 |
| 5,621,841 A | * | 4/1997 | Field | 385/113 |
| 6,205,277 B1 | * | 3/2001 | Mathis et al. | 385/106 |
| 6,343,172 B1 | * | 1/2002 | Schiestle et al. | 385/101 |
| 2002/0096354 A1 | * | 7/2002 | Chopra et al. | 174/102 D |
| 2007/0079984 A1 | * | 4/2007 | Nakai | H01B 11/1808 174/102 R |
| 2007/0280610 A1 | * | 12/2007 | Mallya et al. | 385/101 |
| 2008/0279512 A1 | * | 11/2008 | Korman | 385/100 |
| 2013/0336623 A1 | * | 12/2013 | Chamberlain et al. | 385/101 |

FOREIGN PATENT DOCUMENTS

WO     WO 94/22039 A1  *  9/1994  ............... G02B 6/44

* cited by examiner

*Primary Examiner* — Mike Stahl
(74) *Attorney, Agent, or Firm* — Sutherland Asbill & Brennan LLP (57) ABSTRACT

Certain embodiments herein relate to a hybrid cable that includes a center conductor for distributing electrical signals and one or more optical fibers adjacent to the center conductor for distributing light signals in a service provider network. According to one configuration, materials found in a coaxial cable may be included in the hybrid cable, such as a dielectric material, one or more protective shields, and an outer protective core. Such a hybrid cable may be utilized to replace drop cables in a service provider network, which may connect an access point, such as a tap, to a customer location. Certain embodiments herein may also relate to making and installing the hybrid cable.

18 Claims, 5 Drawing Sheets

INTEGRATING OPTICAL FIBER WITH COAXIAL CABLE

TECHNICAL FIELD

Embodiments of this disclosure relate generally to coaxial cable configurations, and more particularly, to integrating multiple bandwidth mediums with the coaxial cable.

BACKGROUND

Existing networks utilized by service providers, such as cable and satellite providers, may rely predominantly upon coaxial cable in their networks for distributing content to customer locations. An increasing portion of these networks, however, may be replaced with optical fibers or other high bandwidth transport mediums to meet growing customer demand for broadband services. Deploying optical fibers and maintaining existing coaxial cables, however, may be expensive and may slow deployment of broadband services as resources may be split between maintaining coaxial cables and deploying optical fibers.

BRIEF DESCRIPTION

Some or all of the above needs and/or problems may be addressed by certain embodiments of the disclosure. Certain embodiments herein may include a hybrid cable that includes multiple bandwidth transport mediums. According to one embodiment, there is disclosed an apparatus comprising a center conductor for distributing electrical signals in a service provider network; one or more optical fibers for distributing light signals in the service provider network, wherein the one or more optical fibers are adjacent to the center conductor; a dielectric material surrounding at least a respective first portion of the center conductor and the adjacent one or more optical fibers; one or more shields surrounding at least a second portion of dielectric material; and an outer core surrounding at least a third portion of a shield of the one or more shields.

According to another embodiment, there is disclosed a system comprising an access point in a service provider network; a gateway device communicatively coupled to customer premise equipment at a customer location; and an apparatus comprising a center conductor for conducting electrical signals in the service provider network, and one or more optical fibers for distributing light signals in the service provider network, wherein the one or more optical fibers are adjacent to the center conductor. A first end of the apparatus is connected to the access point, and a second end of the apparatus is connected to the gateway device, in one configuration.

According to a further embodiment, there is disclosed a method comprising advancing, simultaneously, a center conductor and one or more optical fibers along a path such that the one or more optical fibers are adjacent to the center conductor; applying a polyethylene foam to at least a first portion of the center conductor and at least a second portion of the one or more optical fibers to form a dielectric surrounding the at least a first portion and the at least a second portion; applying one or more shields surrounding at least a third portion of the polyethylene foam; and applying an outer core surrounding at least a fourth portion of a shield of the one or more shields. The above steps may be performed to construct a hybrid cable, in one example.

BRIEF DESCRIPTION OF THE FIGURES

The detailed description is set forth with reference to the accompanying drawings, which are not necessarily drawn to scale. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, a hybrid cable for transmitting content in a service provider network, such as a cable provider network. A service provider network may include multiple types of coaxial cables, as well as other types of transport mediums. Such types of coaxial cables may include, but are not limited to, drop cables, which may carry content to a customer location, as well as hardline cables, which may carry content between service provider devices, such as a headend and a tap or cable line terminator. Examples of such content may include text, video, audio, multimedia, and/or other data. Certain embodiments herein relate to replacing drop cables with hybrid cables such that multiple transport mediums are included within a coaxial cable configuration, according to one embodiment. In other embodiments, multiple transport mediums may be added to hard line cable via overlashing.

According to one configuration, a hybrid cable as described herein may include a center conductor and optical fibers for conducting electrical signals and light signals, respectively, in the service provider network. One or more materials or substances may surround and protect the center conductor and optical fibers. Such materials or substances may include those which may be utilized in coaxial cables, such as a dielectric material, one or more shields (e.g., foil and/or braid), and an outer protective surface, in one embodiment. The optical fibers may also be embedded within such materials or substances such they may also further benefit from such protection, as well as facilitate a method for making, testing, and installing the hybrid cable, which will also be described in greater detail below.

The technical effects of certain embodiments herein may include, but are not limited to, cost-effective distribution of higher bandwidth transport mediums by leveraging the elements used to construct existing coaxial cables. Each time a coaxial cable requires repair or replacement, for example, a hybrid cable including the repaired coaxial cable elements, as well as the optical fibers, may be installed instead of the coaxial cable. In this way, greater bandwidth transport mediums may be installed within a service provider network as part of the necessary, planned maintenance of the service provider network. In embodiments in which hard line cables, in addition to drop cables, are reconfigured to include multiple transport mediums, a service provider network may be completely installed with coaxial cables and optical fibers for current and future customer demands, respectively, according to one embodiment.

Figure 1:
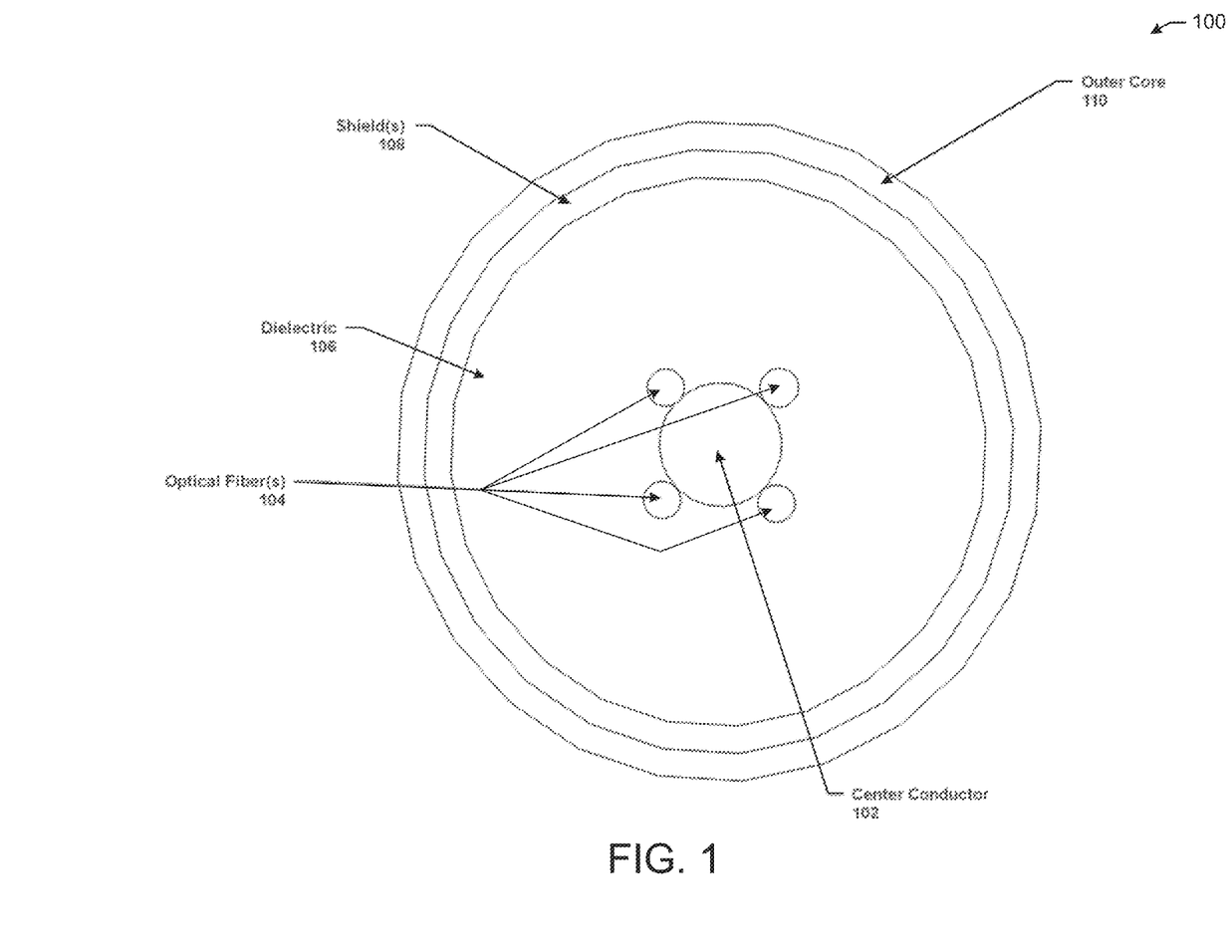
FIG. 1 illustrates a front view of an example configuration of a hybrid cable that includes a coaxial conductor and multiple optical fibers, according to an embodiment of the disclosure.

FIG. 1 depicts a front view of an example configuration of a hybrid cable 100 that includes a coaxial conductor and multiple optical fibers, according to an embodiment of the disclosure. One configuration of the hybrid cable 100 may include, but is not limited to, a center conductor 102, one or more optical fibers 104, a dielectric 106, one or more shields 108, and an outer core 110. Other configurations may involve fewer, more, or different materials or layers in the hybrid cable 100, in other embodiments. According to the configuration shown in FIG. 1, the one or more optical fibers 104 may be adjacent to the center conductor 102, both of which may be surrounded by the dielectric 106. The dielectric 106 may be surrounded by the one or more shields 108, which may be surrounded by an outer core 110. A description of each of these materials is provided below.

The center conductor 102 may conduct electrical signals, such as those carrying content between a service provider and a customer location. In one embodiment, the center conductor 102 may be a center conductor used to conduct electrical signals in a coaxial cable configuration. The center conductor 102 may be composed of various materials, such as copper, iron, and steel, as non-limiting examples. In some configurations, copper-plated iron, steel wire, or silver-plated materials may be used. The center conductor 102 may also include a solid composition or a stranded, more flexible composition, according to various embodiments. The center conductor 102 may be composed of different compositions, materials, etc., in other configurations. In one configuration, the dielectric 106, the one or more shields 108, and the outer core 110 may be designed to, at least in part, protect the center conductor 102 as well as the optical fibers 104, among other functions.

The optical fibers 104 may be formed from various materials that may facilitate the transmission of light signals carrying content in the service provider network. According to one configuration, the optical fibers 104 may include a flexible, transparent fiber core that may be formed from glass (e.g., silica) or a plastic material, as non-limiting examples. The diameter or thickness of the fiber core may vary for different types of optical fibers 104. For example, the diameter for a single mode optical fiber 104 may vary between approximately 8 to 10 microns. The diameter for a multimode optical fiber 104 may vary between approximately 50 to 100 microns. Other diameter sizes, types of optical fibers 104, etc., may exist in other embodiments.

The optical fibers 104 may further include a cladding material that may surround the fiber core and may reflect light waves toward the core of the transparent fiber to facilitate data traveling throughout the length of the optical fiber 104. The cladding may include a silica gel that may have a different index of refraction than that for the fiber core to facilitate refraction of the light waves, and consequently, a reduction in bend losses. In one embodiment, the index of refraction associated with the cladding may be increased to reduce potential bend losses that may otherwise result from embedding the optical fibers 104 in a coaxial cable to form the hybrid cable 100. As will be described below, other materials in the hybrid cable 100 may also facilitate a reduction in bend losses that may be experienced by the optical fibers 104 as well as the center conductor 102. The cladding may be surrounded by a polyethylene, rubber, Polyvinyl Chloride (PVC), or other type of coating material or jacket to protect the fiber core and cladding. The optical fibers 104 may include fewer, more, or different materials in other embodiments.

Figure 2:
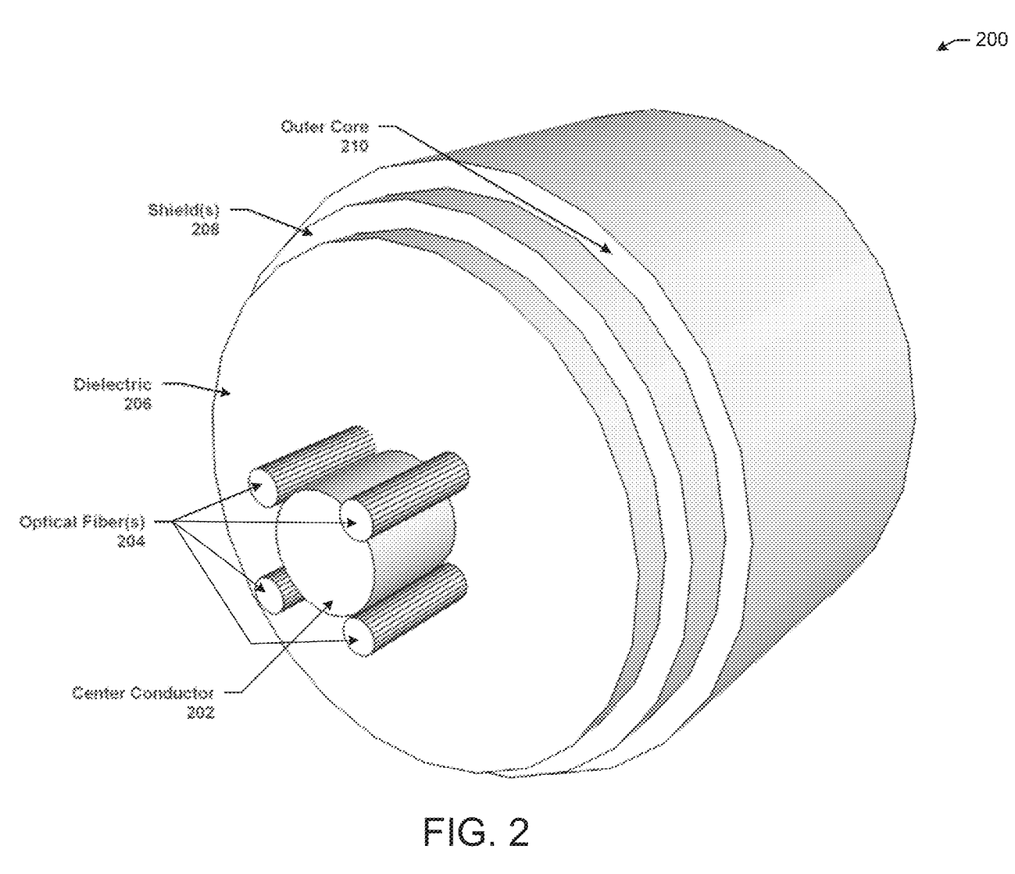
FIG. 2 illustrates a side view of the hybrid cable in FIG. 1, according to an embodiment of the disclosure.

As shown in FIG. 1, the optical fibers 104 may be adjacent to or reside on an outer surface of the center conductor 102 such that at least a portion of the optical fibers 104 contact the outer surface of the center conductor 102. The optical fibers 104 may run lengthwise along at least a portion of the outer surface of the center conductor 102, as shown in FIG. 2. Although only four optical fibers 104 are shown in FIG. 1, fewer or more optical fibers 104 may exist in other configurations. None or at least a portion of the optical fibers 104 may carry content between the service provider and a customer location at any given time.

The optical fibers 104 and the center conductor 102 may be surrounded by a dielectric 106 material, in one configuration. In one embodiment, the dielectric 106 material may secure the optical fibers 104 to the center conductor 102 such that the optical fibers 104 remain adjacent to the center conductor 102. The dielectric material 106 may also provide insulation to the center conductor 102, and consequently, to the optical fibers 104. By way of such insulation, electric and magnetic fields may be confined to the dielectric material 106 such that only a relatively small amount of leakage may occur outside of the dielectric material 106. The dielectric material 106 may be further configured to provide spacing between the center conductor 102 (and/or the surface of adjacent optical fibers 104) and surrounding materials, such as a shield of the one or more shields 108, as will be described in greater detail below.

Example types of the dielectric 106 may include, but are not limited to, a solid or foam layer of polyethylene, and Teflon®. In one embodiment, polyethylene may be sprayed or poured onto the optical fibers 104 and the center conductor 102 such that the dielectric 106 material forms the polyethylene around the optical fibers 104 and the center conductor 102, as shown in FIG. 1. During manufacturing of the hybrid cable 100, in one embodiment, the optical fibers 104 may be advanced along a path (e.g., unwound from one or more reels including the optical fibers 104 and the center conductor 102). In one embodiment, as the optical fibers 104 and the center conductor 102 are advanced (e.g., simultaneously), the dielectric 106 material may be poured or sprayed onto the optical fibers 104 and the center conductor 102. Existing techniques and processes for making the dielectric 106 and the materials surrounding the dielectric 106 may be utilized in some embodiments. Alternative to a solid or foam layer of polyethylene, the optical cables 104 and the center conductor 102 may be wrapped or inserted into a Teflon® insulating material or other insulating materials, such as those that provide for low signal loss, low flame and smoke characteristics, an ability to withstand high temperatures, or other desirable insulation characteristics, in other configurations.

In one configuration, the dielectric 106 may have a modulus of rigidity that may reduce bend loss in the optical fibers 104 that are embedded within the hybrid cable 100. For example, a more rigid dielectric 106 may restrict the optical fibers 104 and the center conductor 102 from bending to an extent that may cause data loss in either of the transport mediums during installation or other activities. As will be described in greater detail below, bend loss for each of the transport mediums may be tested in association with installing the hybrid cable 100.

One or more shields 108 may surround the dielectric material 106 to prevent signal loss of high frequencies, for example, used to transmit data through the center conductor 102, according to one configuration. Example types of a shield 108 may include, but are not limited to, a foil shield, a braided shield, a combination of a foil or braided shield, or a wire mesh. Although a single shield 108 is shown in FIG. 1, more shields, including multiple combinations of shields, may exist in other embodiments. A foil shield may be used to, among other things, reduce radio frequency (RF) interference, which may interfere with data signals traveling through the center conductor 102. In one embodiment, the foil shield may be made of a thin layer of aluminum bonded to a polyester or polypropylene film. Other types of materials may be used in other embodiments. A braided shield may be used to, among other things, reduce the amount of electromagnetic interference (EMI) or low frequency interference exposed to the center conductor 102. The braided shield may be formed using copper, tinned copper, or aluminum, as non-limiting examples. The combination shield may include a combination of both one or more foil shields and one or more braided shields, according to one configuration. Thus, an example configuration may include a foil shield and a braided shield, either of which may surround the dielectric 106.

The one or more shields 108 may be surrounded by an outer core 110. The outer core 110 may serve as the outermost protective surface in the hybrid cable 100, thereby protecting the center conductor 102, the optical fibers 104, the dielectric 106 material, and the one or more shield layers 108, among other components that may be included in the hybrid cable 100. The outer core 110 may be formed from various materials including, but not limited to, rubber, polyethylene, or polyvinyl chloride (PVC).

The above configuration in FIG. 1 is non-limiting. Various other configurations including different numbers of center conductors, optical fibers, insulating materials, and outer surfaces may exist in other embodiments. For example, some embodiments may include transport mediums in addition to or as an alternative to center conductors 102 and optical fibers 104. Such transport mediums may provide different bandwidths for distributing content in a service provider network, for example. Additionally, the location of the optical fibers 104 may vary in some embodiments. For example, the optical fibers 104 may be located between the dielectric 106 material and a shield 108, in one embodiment. In other configurations, the optical fibers 104 may be located between shields 108 or between a shield 108 and the outer core 110. As a further example, different materials may exist in the hybrid cable 100. Such materials may include, but are not limited to, synthetic yarns (e.g., Kevlar™) or other materials that may be used to provide added protection or strength to the hybrid cable 100 to assist with installing the hybrid cable 100 and/or longevity of the hybrid cable 100. Further, fiberglass or other rigid materials may be added to the hybrid cable 100 to restrict the hybrid cable 100 from enduring excessive bending during installation, for example, to reduce bend loss.

FIG. 2 depicts an exploded, side view of an example configuration of the hybrid cable 100 in FIG. 1, according to an embodiment of the disclosure. FIG. 2 is exploded in the way that each surrounding element is pulled back from its innermost element to facilitate viewing of each element of the hybrid cable 100. As shown in FIG. 2, the optical fibers 204 may run lengthwise along at least a portion of the center conductor 202. The optical fibers 204 and the center conductor 202 may be surrounded by the dielectric 206 material, which may be surrounded by the one or more shields 208. The outer core 210 may surround each of these components to provide protection to the components, among other functions.

Numerous other configurations may exist in other embodiments, some of which are described above in association with FIG. 1.

Figure 3:
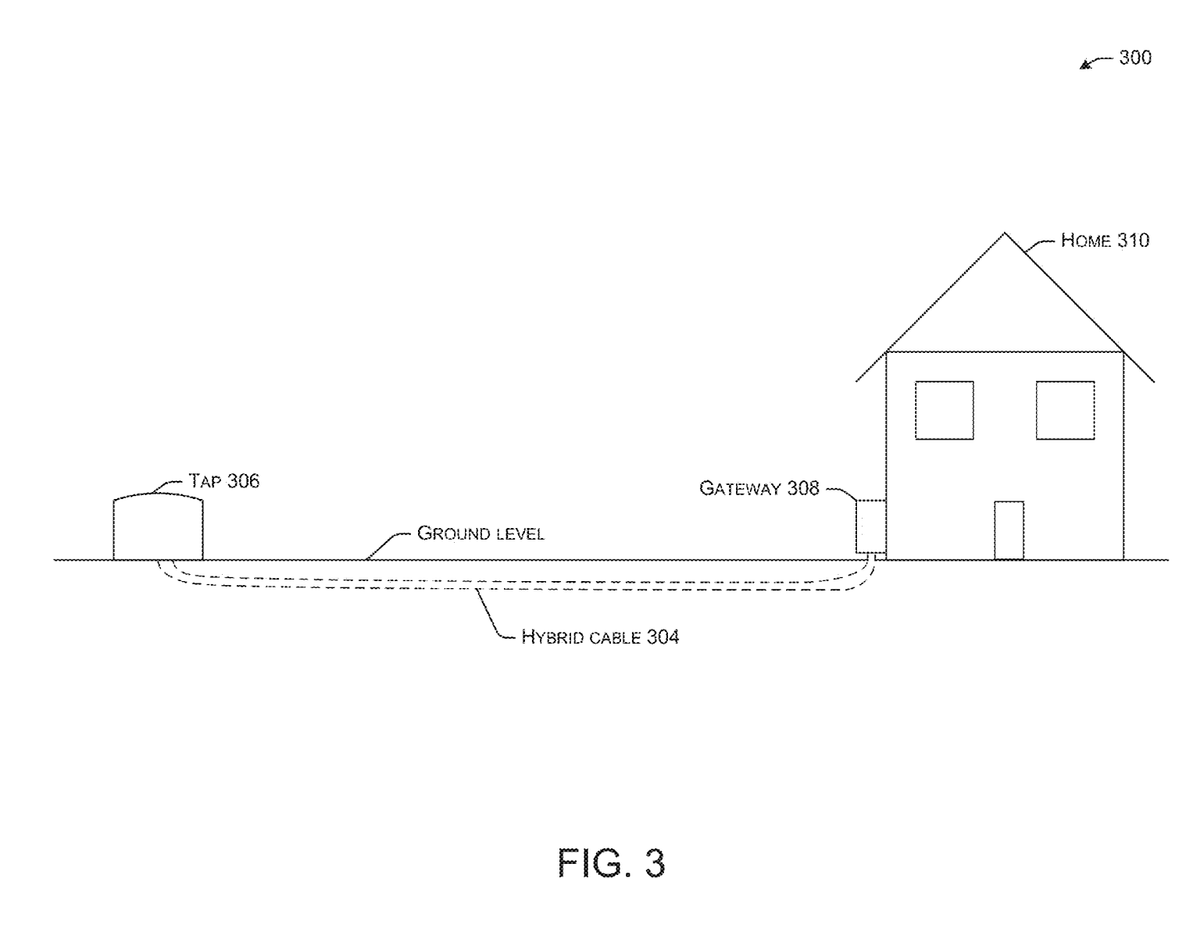
FIG. 3 illustrates an example installation of the hybrid cable in a service provider network, according to an embodiment of the disclosure.

FIG. 3 depicts an example installation of a hybrid cable in a service provider network 300, according to an embodiment of the disclosure. The service provider network 300 may include, but is not limited to, a tap 306, a gateway device 308, a home 310 to which the gateway device 308 may be connected, and a hybrid cable 304 connecting the tap 306 to the gateway device 308. The hybrid cable 304 may embody the hybrid cable 100 shown in FIG. 1, in one embodiment.

As shown in FIG. 3, a first end of the hybrid cable 304 may be connected to the tap 306, and a second end of the hybrid cable 304 may be connected to a gateway device 308, which may be connected to the home 310. According to this configuration, the hybrid cable 304 may distribute signals between the tap 306 and the gateway device 308 for routing to a service provider or a customer location, respectively. Either a center conductor 102 and/or one or more optical fibers 104 may be utilized to distribute the signals, according to various embodiments. When the optical fibers 104 are used, the gateway device 308 may be included in a media converter, which may further include an optical network terminal (ONT) for receiving broadband signals.

The tap or terminator 306 may form an access point from which one or more user locations may be provided with content. The tap 306 may feed multiple hybrid cables 304, as well as other cables (e.g., various types of coaxial cables, radio frequency (RF) cables, twisted pair cables, etc.) to various homes or user locations to facilitate transmission of such content. Access point equipment or devices other than a tap may exist in other configurations.

The gateway device 308 may include one or more components that may be configured to provide broadband services to the home 310. For example, a gateway device 308 may include a broadband modem and/or a router that may be configured to process received data signals (e.g., received via the center conductor 102 or the optical fibers 104 in FIG. 1) and provide the signals to customer premise equipment in the home 310, for example. Such customer premise equipment may include, but is not limited to, set-top boxes, cable modems, routers, and network bridging devices at the home 310. In certain embodiments, a network, such as a local area network or a wide area network, may be formed between the gateway device 308 and the customer premise equipment.

In addition to drop cables, hard line cables in a service provider network may be configured to include both coaxial cable components (e.g., a center conductor 102 in FIG. 1) and one or more optical fibers (e.g., optical fibers 104 in FIG. 1). In one embodiment, such a configuration may be accomplished via overlashing. By using overlashing techniques, the optical fibers 104 may be intertwined with center conductors 102 to create a cable that includes both one or more center conductors and one or more optical fibers.

Hard line cables as described herein may differ from drop cables in various ways. For example, hard line cables may exist at locations in a service provider network that are closer to the service provider than drop cables connected to a customer location. Further, hard line cables may have a diameter that is relatively larger than that of a drop cable. According to one configuration, a service provider network may deliver content to customer locations via a combination of hard line cables and drop cables. Thus, based on such a configuration, a complete fiber network may be implemented in a service provider network by replacing drop cables with the hybrid cable described herein and by overlashing hard line cables having center conductors to include one or more optical fibers.

The above configuration in FIG. 3 is not meant to be limiting. Fewer or more of these devices, as well as different devices from those shown in FIG. 3, may exist in other embodiments. For example, in some embodiments, a media converter device, which may include a radio frequency (RF) physical layer component, an optical network terminal for sending and receiving light signals, a gateway device, etc., may be communicatively coupled to customer premise equipment at the home 310 as well as may exist at various locations in a service provider network.

Figure 4:
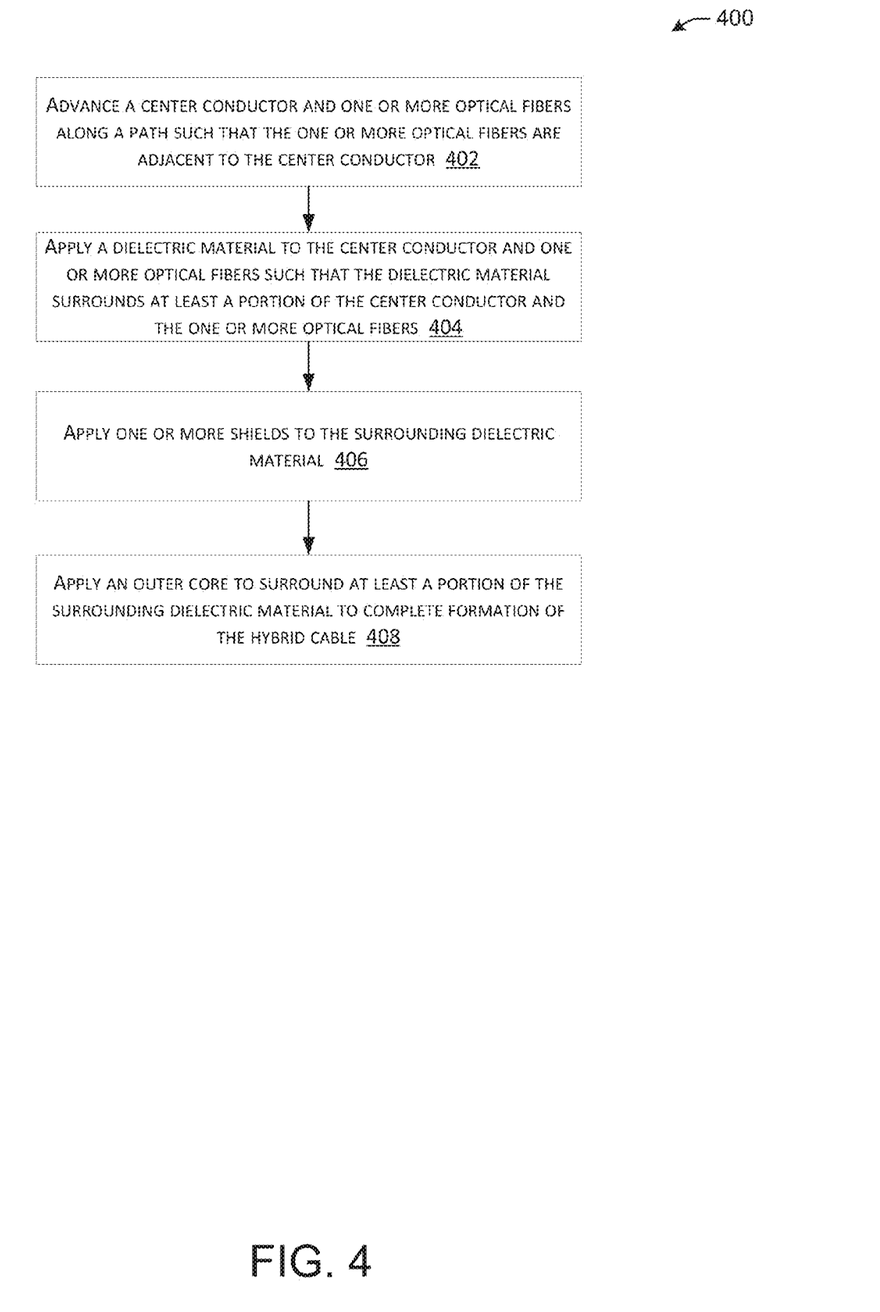
FIG. 4 illustrates a flow diagram of an example process for making a hybrid cable, according to an embodiment of the disclosure.

FIG. 4 depicts a flow diagram of an example process for making a hybrid cable, such as the hybrid cable 100 in FIG. 1, according to an embodiment of the disclosure. The example process may begin at block 402, where a center conductor (e.g., the center conductor 102) and one or more optical fibers (e.g., optical fibers 104) may be advanced along a path as both types of transport mediums are unwound from one or more reels via machinery or equipment configured to perform such a function. In one embodiment, the center conductor and one or more optical fibers may be brought closer to one another along the path such that the optical fibers become adjacent to the center conductor.

As the center conductor is being advanced along the path, dielectric material (e.g., the dielectric material 106 in FIG. 1) may be applied to the center conductor and the adjacent optical fibers such that the dielectric material surrounds at least a portion of the center conductor and the optical fibers, at block 404. In one embodiment, polyethylene, polypropylene, or other suitable substances may be applied to the center conductor and optical fibers. Such substances may be poured or sprayed around the center conductor and optical fiber, according to various embodiments. Existing techniques for surrounding a center conductor in a coaxial cable may be utilized to surround the center conductor and optical fibers in the hybrid cable described herein, according to some embodiments.

One or more shields, such as the one or more shields 108 in FIG. 1, may be applied to the dielectric 106 material, at block 406. Examples of such shields may include, but are not limited to, a foil shield, a braid shield, and/or a combination of a foil and braided shield. Existing techniques for applying one or more shields in a coaxial cable configuration may be utilized to apply one or more shields in the hybrid cable as described herein, according to some embodiments.

The one or more shields may be surrounded by an outer core, such as the outer core 110 in FIG. 1, which may provide the outermost protection for the hybrid cable, at block 408. Existing techniques for applying an outer core or surrounding jacket for a coaxial cable configuration may be utilized to apply an outer core for the hybrid cable described herein, according to some embodiments.

Figure 5:
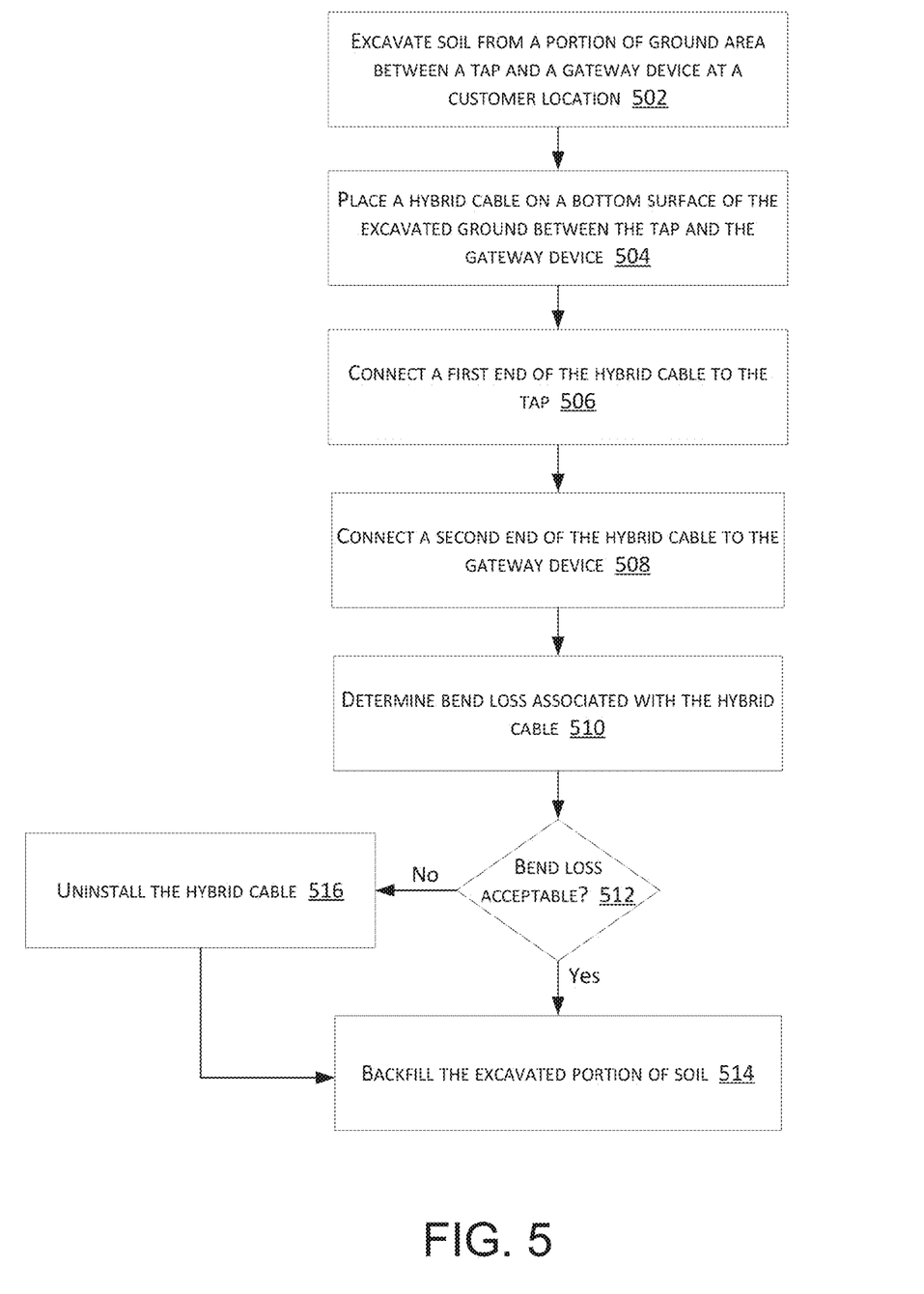
FIG. 5 illustrates a flow diagram of an example process for installing a hybrid cable in a service provider network, according to an embodiment of the disclosure.

FIG. 5 depicts a flow diagram of an example process for installing a hybrid cable in a service provider network, according to an embodiment of the disclosure. In one embodiment, the hybrid cable 100 in FIG. 1 may be installed in the service provider network. A portion of the service provider network comprising the hybrid cable may be the portion shown in FIG. 3. The example process may begin at block 502, where soil, earth, or another substance may be excavated between a tap (e.g., the tap 306) and a gateway device (e.g., the gateway device 308) located at a customer location (e.g., a home 310), in one embodiment. A media converter that includes an optical network terminal (ONT) for handling broadband signals, as well as other broadband equipment or devices, may exist in other embodiments. At block 504, the hybrid cable may be placed on the bottom surface of the excavated ground between the tap and the gateway device such that the hybrid cable is below ground level, as indicated in FIG. 3.

A first end of the hybrid cable may be connected to an access point in the service provider network (e.g., the tap 306 in FIG. 3), at block 506. A second opposing end of the hybrid cable may be connected to the gateway device, at block 508. Such connections may facilitate distribution of content between a service provider and a customer location, in one embodiment.

A bend loss associated with the hybrid cable may be determined, at block 510. In one embodiment, existing techniques used to test bend loss associated with coaxial cables may be utilized to determine bend loss for the hybrid cable, particularly the optical fibers embedded in the hybrid cable, in one embodiment. By virtue of the optical fibers being adjacent to the center conductor, bend loss measurements associated with the center conductor may be attributable to the optical fibers embedded in the hybrid cable, in one embodiment.

If the bend loss test yielded results within an acceptable tolerance for both the optical fibers and the center conductor (at block 512), then the excavated portion of the soil may be backfilled such that the hybrid cable may be buried, at block 514. Various substances may be used to perform the backfill, such as the excavated soil or earth, dirt, gravel, etc. If the bend loss test did not yield an acceptable tolerance, the hybrid cable may be uninstalled (e.g., disconnected from both the access point and gateway device) and removed from the excavated portion of the earth, at block 516. The excavated portion may be backfilled without burying the hybrid cable in this instance, at block 514.

Various schematic and/or flow diagrams of systems, methods, and/or apparatus according to example embodiments of the invention are described above. It will be understood that some blocks of the schematic diagrams and flow diagrams may not necessarily need to be performed in the order presented, or may not necessarily need to be performed at all, according to some embodiments. It will also be understood that each block of the flow diagrams, and combinations of blocks in the flow diagrams, may be implemented by hardware-based computer systems, machines, or devices that perform the perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   two or more center conductors for distributing electrical signals in a service provider network;
   three or more optical fibers for distributing light signals in the service provider network, the three or more optical fibers angularly spaced around the two or more center conductors and advanced along a path with the two or more center conductors such that the three or more optical fibers are adjacent to the two or more center conductors;

a dielectric material surrounding at least a respective first portion of the two or more center conductors and the three or more optical fibers;

one or more shields surrounding at least a second portion of dielectric material; and an outer core surrounding at least a third portion of a shield of the one or more shields.

2. The apparatus of claim 1, wherein a first end of the apparatus is connected to an access point in the service provider network and a second end of the apparatus is connected to a gateway device at a customer location.

3. The apparatus of claim 1, wherein the apparatus is a drop cable.

4. The apparatus of claim 1, wherein at least a portion of the three or more optical fibers comprises a respective diameter between 8 and 10 microns.

5. The apparatus of claim 1, wherein the dielectric material comprises polyethylene foam.

6. The apparatus of claim 1, wherein the one or more shields comprise one or more of at least one of a foil shield, a braided shield, or a wire mesh.

7. A system comprising:

an access point in a service provider network;

a gateway device communicatively coupled to customer premise equipment at a customer location; and an apparatus comprising two or more center conductors for conducting electrical signals in the service provider network, and three or more optical fibers for distributing light signals in the service provider network, wherein the three or more optical fibers angularly spaced around the two or more center conductors and are advanced along a path with the two or more center conductors such that the three or more optical fibers are adjacent to the two or more center conductors;

wherein a first end of the apparatus is connected to the access point, and a second end of the apparatus is connected to the gateway device.

8. The system of claim 7, wherein the apparatus further comprises:

a dielectric material surrounding at least a respective first portion of the two or more center conductors and the adjacent three or more optical fibers;

one or more shields surrounding at least a second portion of dielectric material; and an outer core surrounding at least a third portion of a shield of the one or more shields.

9. The system of claim 7, wherein the access point and the gateway device facilitate transmission of broadband signals over at least a portion of the three or more optical fibers.

10. The system of claim 7, wherein the apparatus is a drop cable.

11. The system of claim 7, wherein at least a portion of the one or more optical fibers comprises a respective diameter between 8 and 10 microns.

12. The system of claim 7, wherein the dielectric material comprises polyethylene foam.

13. The system of claim 8, wherein the access point is a tap.

14. A method comprising:

advancing two or more center conductors and three or more optical fibers along a path such that the three or more optical fibers are angularly spaced around the two or more center conductors and adjacent to the two or more center conductors;

applying a polyethylene foam to at least a first portion of the two or more center conductors and at least a second portion of the three or more optical fibers to form a dielectric surrounding the at least a first portion and the at least a second portion;

applying one or more shields surrounding at least a third portion of the dielectric; and applying an outer core surrounding at least a fourth portion of a shield of the one or more shields;

wherein the advancing, the applying the polyethylene foam, the applying the one or more shields, and the applying the outer core form a hybrid cable.

15. The method of claim 14, wherein the two or more center conductors and the three or more optical fibers are advanced simultaneously.

16. The method of claim 14, further comprising:

excavating a portion of a substance between an access point in a service provider network and a gateway device communicatively coupled to customer premise equipment at a customer location;

connecting a first end of the hybrid cable to the access point;

connecting a second end of the hybrid cable to the gateway device; and backfilling the excavated portion such that at least a portion of the hybrid cable is buried.

17. The method of claim 16, wherein the two or more center conductors conduct electrical signals in the service provider network, and the three or more optical fibers distribute light signals in the service provider network.

18. The method of claim 14, further comprising determining a first bend loss associated with at least one of the three or more optical fibers, wherein the bend loss is based at least in part on a second bend loss associated with the two or more center conductors.

* * * * *